(12) United States Patent
Ganis

(10) Patent No.: US 10,046,851 B2
(45) Date of Patent: Aug. 14, 2018

(54) LANDING GEAR NOISE ABATEMENT DEVICES

(71) Applicant: GOODRICH CORPORATION, Charlotte, NC (US)

(72) Inventor: Rony Giovanni Ganis, Ontario (CA)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/706,033

(22) Filed: Sep. 15, 2017

(65) Prior Publication Data

US 2018/0022445 A1 Jan. 25, 2018

Related U.S. Application Data

(62) Division of application No. 14/048,914, filed on Oct. 8, 2013, now Pat. No. 9,796,467.

(51) Int. Cl.
| | |
|---|---|
| *B64C 1/40* | (2006.01) |
| *B64C 23/00* | (2006.01) |
| *B64C 25/16* | (2006.01) |
| *B64C 25/00* | (2006.01) |
| *B64C 7/00* | (2006.01) |

(52) U.S. Cl.
CPC ............... *B64C 25/16* (2013.01); *B64C 7/00* (2013.01); *B64C 25/001* (2013.01); *B64C 2025/003* (2013.01)

(58) Field of Classification Search
CPC ..... B64C 2025/003; B64C 25/16; B64C 7/00; B64C 25/001
See application file for complete search history.

(56) References Cited

U.S. PATENT DOCUMENTS

| | | | | |
|---|---|---|---|---|
| 2,129,824 | A | * | 9/1938 | De Seversky ........... B64C 25/16 244/102 R |
| 2,180,462 | A | * | 11/1939 | De Seversky ........... B64C 25/16 244/102 R |
| 6,619,587 | B1 | | 9/2003 | Chow et al. |
| 6,786,451 | B2 | | 9/2004 | Courtois et al. |
| 7,484,688 | B2 | * | 2/2009 | Chow ...................... B64C 7/00 244/100 R |
| 8,376,261 | B2 | * | 2/2013 | Chow ...................... B64C 7/00 244/1 N |
| 9,193,447 | B2 | | 11/2015 | Chow et al. |
| 9,290,263 | B2 | | 3/2016 | Cook et al. |
| 9,346,538 | B2 | * | 5/2016 | Simonneaux ........... B64C 25/16 |
| 2003/0102406 | A1 | | 6/2003 | Chow et al. |
| 2003/0164423 | A1 | | 9/2003 | Courtois et al. |

(Continued)

FOREIGN PATENT DOCUMENTS

EP 1340676 9/2003

OTHER PUBLICATIONS

Extended European Search Report dated Mar. 11, 2015 in European Application No. 14187866.0.

*Primary Examiner* — Philip J Bonzell
(74) *Attorney, Agent, or Firm* — Snell & Wilmer L.L.P.

(57) ABSTRACT

A noise abatement system for an aircraft landing gear is provided. The system may have a retention member and a covering member. In this regard, the system may be configured to block the airflow through a structural void to abate noise. Moreover, the system may be shaped to diminish aerodynamic drag.

11 Claims, 16 Drawing Sheets

(56) References Cited

U.S. PATENT DOCUMENTS

| | | | |
|---|---|---|---|
| 2006/0102775 A1* | 5/2006 | Chow | B64C 7/00 244/1 N |
| 2009/0078821 A1* | 3/2009 | Chow | B64C 7/00 244/1 N |
| 2009/0176078 A1 | 7/2009 | Seror et al. | |
| 2010/0155529 A1 | 6/2010 | Chow et al. | |
| 2011/0139926 A1 | 6/2011 | Chow et al. | |
| 2015/0083857 A1* | 3/2015 | Simonneaux | B64C 25/16 244/102 R |

* cited by examiner

US 10,046,851 B2

LANDING GEAR NOISE ABATEMENT DEVICES

CROSS-REFERENCE TO RELATED APPLICATION

This application is a divisional of U.S. Ser. No. 14/048,914, filed Oct. 8, 2013, now U.S. Pat. No. 9,796,467, entitled "LANDING GEAR NOISE ABATEMENT DEVICES," which is hereby incorporated by reference in its entirety.

FIELD

The present disclosure relates to landing gear systems and, more specifically, to a noise abating device for use with an articulating landing gear.

BACKGROUND

Aircraft noise generated during approach is a growing concern at airports. Noise restrictions have a significant influence on the availability of flight times and allowed aircraft types. Due to significant advances in engine technology, airframe noise is becoming relatively more significant as a source of noise. Typical articulating or trailing arm type landing gear systems incorporate a forward main post and a trailing arm attached via a joint. A shock strut may extend between these two members so that the trailing arm may articulate upward or downward. Typically, the joint is a forked clevis at the lower end of the main post, mating to the trailing arm. During deployment, prior to landing and/or after takeoff, air rushes through an open space within the forked clevis, causing noise and harsh tones at frequencies audible to the human ear. Thus, there remains a need for landing gear noise abatement systems.

SUMMARY

A noise abatement system may comprise a retention member and a covering member.

In various embodiments, a retention member may comprise a post adapted to interface with the landing gear by friction fitting or a fastening apparatus adapted to interface with the landing gear by fasteners.

In various embodiments, a covering member may comprise a void covering portion which extends substantially across a void in the landing gear, and optionally, a landing gear covering portion which extends beyond one or more of the edges of the void.

BRIEF DESCRIPTION OF THE DRAWINGS

The subject matter of the present disclosure is particularly pointed out and distinctly claimed in the concluding portion of the specification. A more complete understanding of the present disclosure may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. As used herein, phrases such as "make contact with," "coupled to," "touch," "interface with" and "engage" may be used interchangeably.

Figure 1:
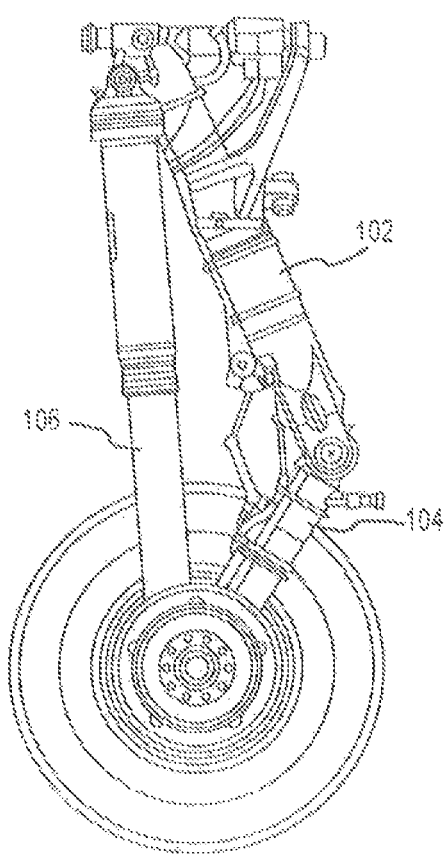
FIGS. 1 and 2 illustrate views of a prior art articulating landing gear.
Figure 2:
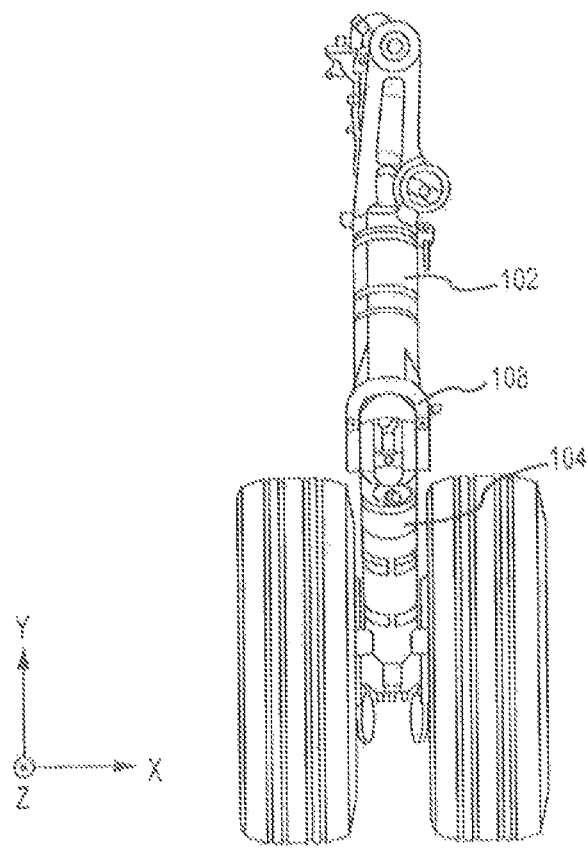

With reference to FIGS. 1 and 2, typical articulating or trailing arm type landing gear systems incorporate a forward main post 102 and a trailing arm 104 attached via a joint. A shock strut 106 may extend between these two members so that the trailing arm 104 may articulate upward or downward (e.g., along the y axis). Typically the joint is a forked clevis at the lower end of the main post 102, mating to the trailing arm 104. A void 108 is bounded in the X-axis by the forked clevis at the lower end of the main post 102 and in the Y-axis by the main post 102 and the trailing arm 104. The void extends in the Z-axis through the landing gear system so that during deployment of the landing gear, air may rush through the void, causing noise and harsh tones at frequencies audible to the human ear.

Figure 3:
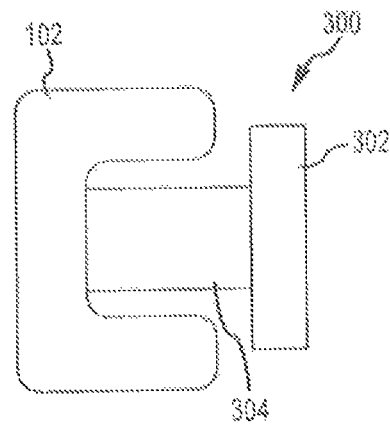
FIG. 3 illustrates various components of a landing gear noise abatement system, in accordance with various embodiments.

With reference to FIG. 3, in various embodiments, a noise abatement system 300 may comprise a retention member 304 and a covering member 302. Retention member 304 interfaces with a forward main post 102 of a landing gear. Covering member 302 attaches to or is integral with retention member 304. Covering member 302 is configured to block air from flowing through a void in the landing gear.

Figure 4:
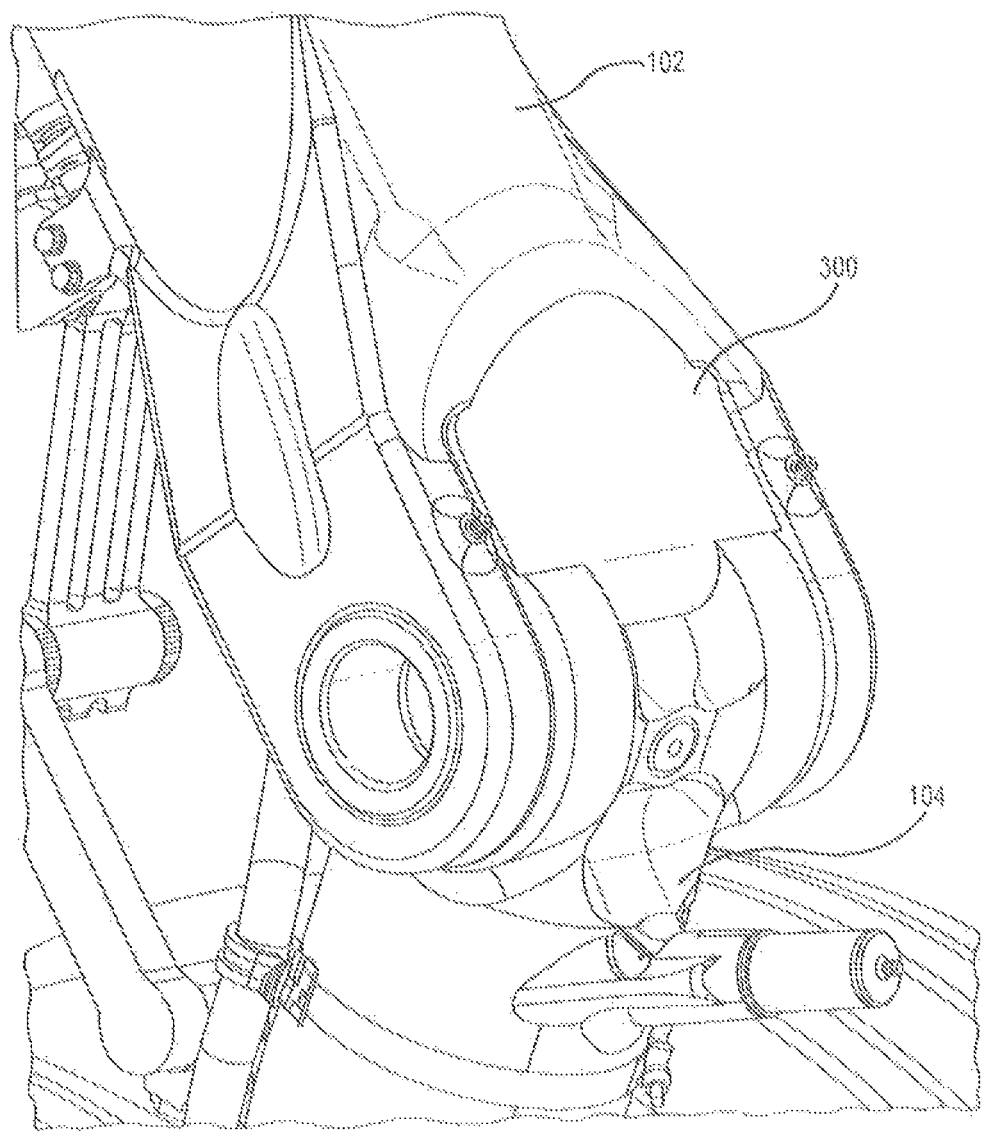
FIG. 4 illustrates a landing gear noise abatement system installed in a landing gear, in accordance with various embodiments.

With continuing reference to FIG. 3, and momentary reference to FIG. 4, in various embodiments, retention member 304 of a noise abatement system 300 may interface with forward main post 102 by friction fitting into a cavity in forward main post 102. The term cavity as used herein may refer to a portion of the interface between a structure that bounds void 108 and that engages retention member 304. Alternatively, retention member 304 may interface with forward main post 102 via snap-fitting, via detents, via fasteners, or via any other configuration or mechanism suitable for holding, maintaining, or otherwise coupling or retaining retention member 304 in mechanical communication with forward main post 102.

In various embodiments, covering member 302 may extend substantially over void 108 in the landing gear and/or may occupy a cross-sectional area bounded in the X-axis by the forked clevis at the lower end of the main post 102 and in the Y-axis by the main post 102 and the trailing arm 104. However, covering member 302 may be positioned in any configuration adapted to ameliorate aerodynamic noise by diverting air flow from the void 108. In various embodiments, covering member 302 extends in a plane substantially normal to the direction of air flow. In various embodiments, a covering member comprises a void covering portion which extends substantially over a void in the landing gear or may occupy a cross-sectional area bounded in the X-axis by the forked clevis at the lower end of the main post 102 and in the Y-axis by the main post 102 and the trailing arm 104. In various exemplary embodiments of noise abatement systems, a covering member includes a void covering portion and other covering portions, which extend beyond one or more of the edges of the void, for example, forward main post covering portions, trailing arm covering portions, side flange covering portions, and fastening side flange covering portions as illustrated with respect to the various exemplary embodiments of noise abatement systems of FIG. 3-FIG. 16.

Figure 5:
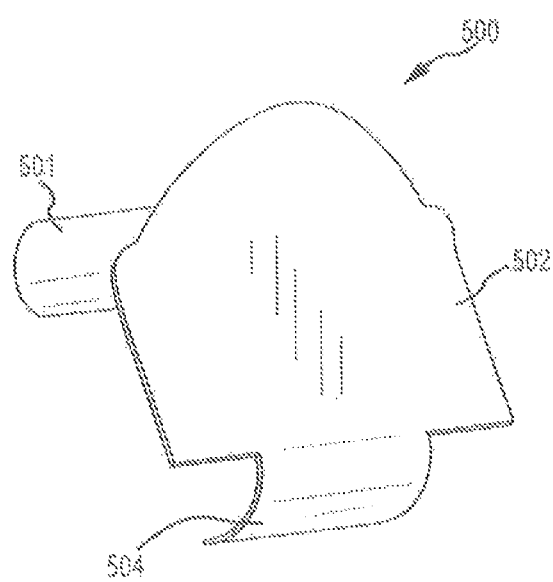
FIG. 5 illustrates a landing gear noise abatement system having a retention member comprising a post, in accordance with various embodiments.

With reference to FIG. 5, noise abatement system 500 is shown. A retention member comprises a post 501 adapted to interface with forward main post 102 via friction fitting. In various embodiments, post 501 slides into a cavity in forward main post 102 and frictionally engages at least one surface of the cavity. In various embodiments, post 501 may engage a cavity comprising the entire void, or a portion of a void, for example, two sides of the void, or three sides of the void, or four sides of the void, or all sides of the void, or any configuration or number of surfaces of the void suitable for holding, maintaining, or otherwise coupling or retaining the post 501 in mechanical communication with forward main post 102.

Figure 6:
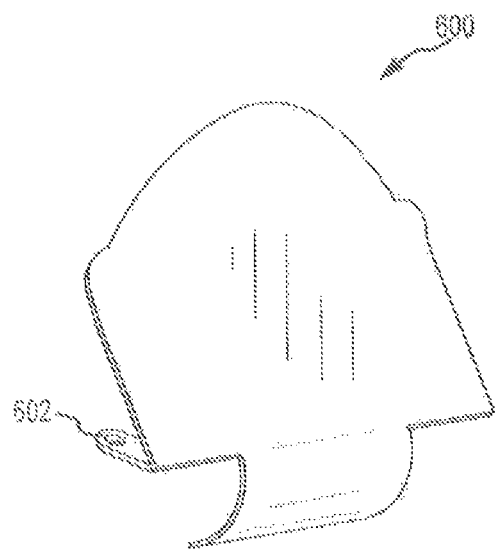
FIG. 6 illustrates a landing gear noise abatement system having a retention member comprising a tab adapted to interface with a landing gear via a fastener, in accordance with various embodiments.

With reference to FIG. 6, in various embodiments of noise abatement system 600, a retention member comprises a tab 602 adapted to interface with forward main post 102 via insertion of a fastener through an aperture in tab 602. In various embodiments, noise abatement system 600 may have one tab 602. Alternatively, a noise abatement system 600 may have two tabs, three tabs 602, four tabs 602, or any number of tabs suitable for holding, maintaining, or otherwise coupling or retaining retention member 304 in mechanical communication with forward main post 102. In one embodiment, tab 602 may be arranged on a left or right side of noise abatement system 600. Alternatively, tab 602 may be arranged on an upper or lower side of noise abatement system 600, or may be arranged on multiple sides of the noise abatement system 600 or may comprise any arrangement of tabs suitable for holding, maintaining, or otherwise coupling or retaining retention member 304 in mechanical communication with forward main post 102.

With renewed reference to FIG. 5, a covering member may comprise a void covering portion 502 and/or may comprise other additional portions, or no additional portions. As illustrated with respect to various additional embodiments discussed herein, the covering member may extend beyond one or more of the edges of the void 108 such that void covering portion 502 of the covering member only comprises a portion of the covering member. In various embodiments, the void covering portion 502 comprises a flat piece of material having a curved flange section 504 wherein the void covering portion 502 is shaped to substantially fit a profile of a void 108 in the landing gear.

Figure 7:
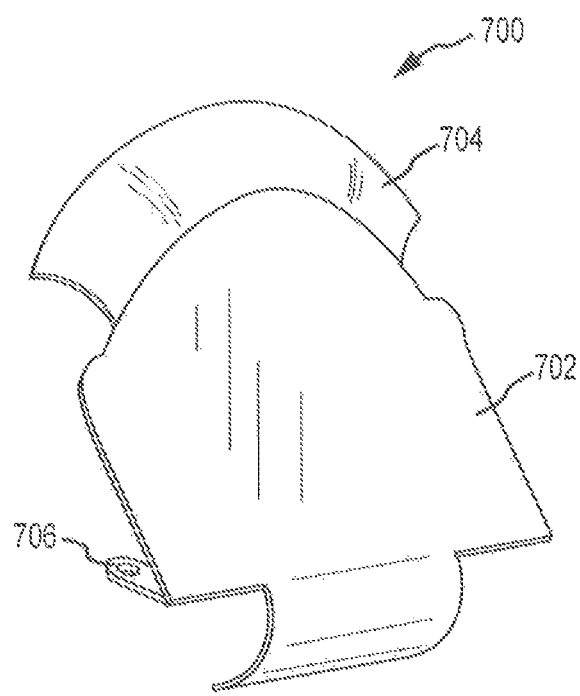
FIG. 7 illustrates a landing gear noise abatement system having a covering member with an void covering portion and a forward main post covering portion extending upward, in accordance with various embodiments.
Figure 12:
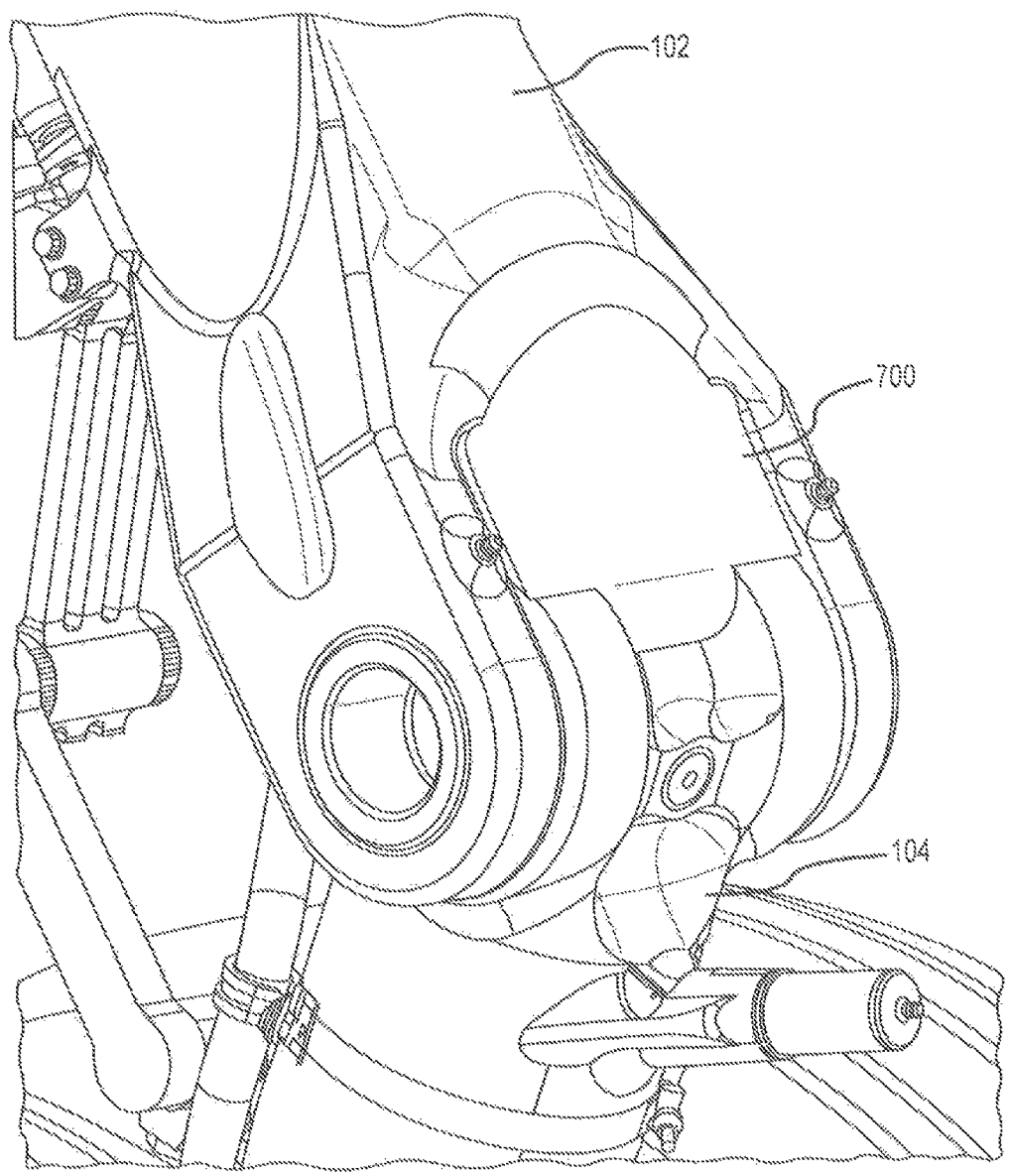
FIG. 12 illustrates a landing gear noise abatement system according to FIG. 7 installed in a landing gear, in accordance with various embodiments.

With reference to FIGS. 7 and 12, noise abatement system 700 may have a retention member comprising a tab 706 and a covering member with a void covering portion 702. For example, with reference to FIG. 7, in various embodiments of a noise abatement system 700, a covering member comprises both a void covering portion 702 and a forward main post covering portion 704 which extends upward away from the forked clevis portion of forward main post 102 to externally shield a portion of the forward main post 102. Moreover, the retention member may alternatively comprise a post, or any other configuration suitable for holding, maintaining, or otherwise coupling or retaining noise abatement system 700 in mechanical communication with the landing gear.

Figure 8:
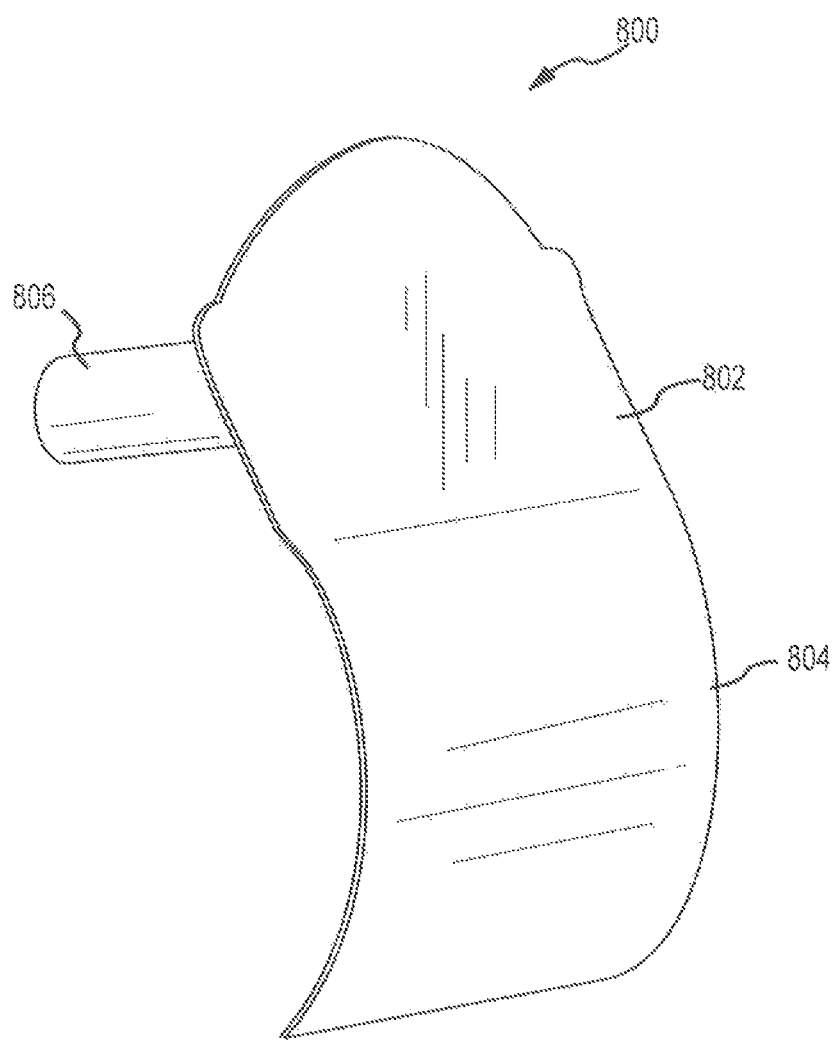
FIG. 8 illustrates a landing gear noise abatement system having a covering member with an void covering portion and a trailing arm covering portion extending downward, in accordance with various embodiments.
Figure 13:
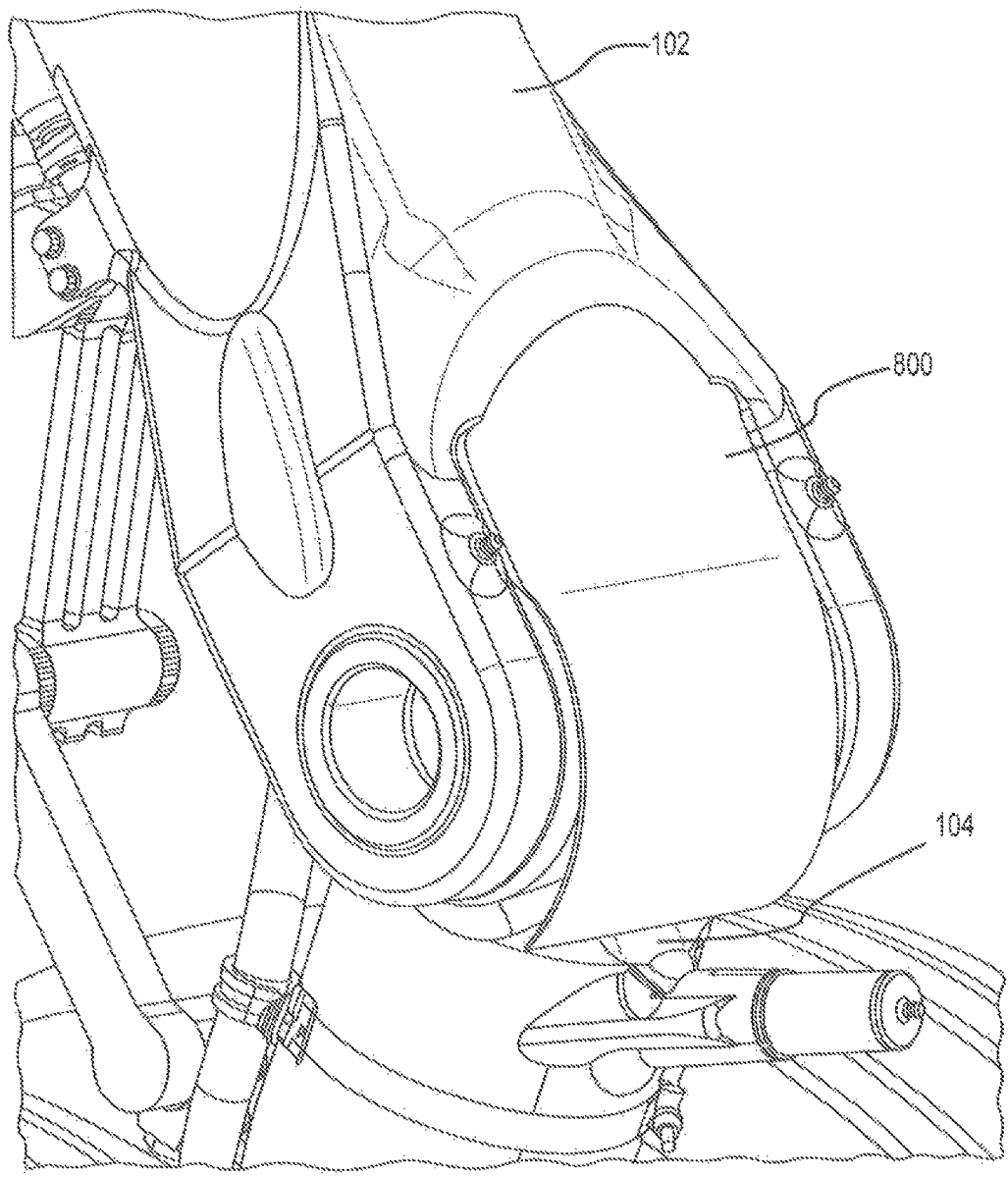
FIG. 13 illustrates a landing gear noise abatement system according to FIG. 8 installed in a landing gear, in accordance with various embodiments.

Alternatively, referring now to FIGS. 8 and 13, noise abatement system 800 may have a retention member comprising a post 806 and a covering member with a void covering portion 802 and a trailing arm covering portion 804 which extends downwardly away from the forked clevis portion of forward main post 102 to externally shield a portion of the trailing arm 104. Moreover, the retention member may alternatively comprise a tab, or any other configuration suitable for holding, maintaining, or otherwise coupling or retaining noise abatement system 800 in mechanical communication with the landing gear.

Figure 9:
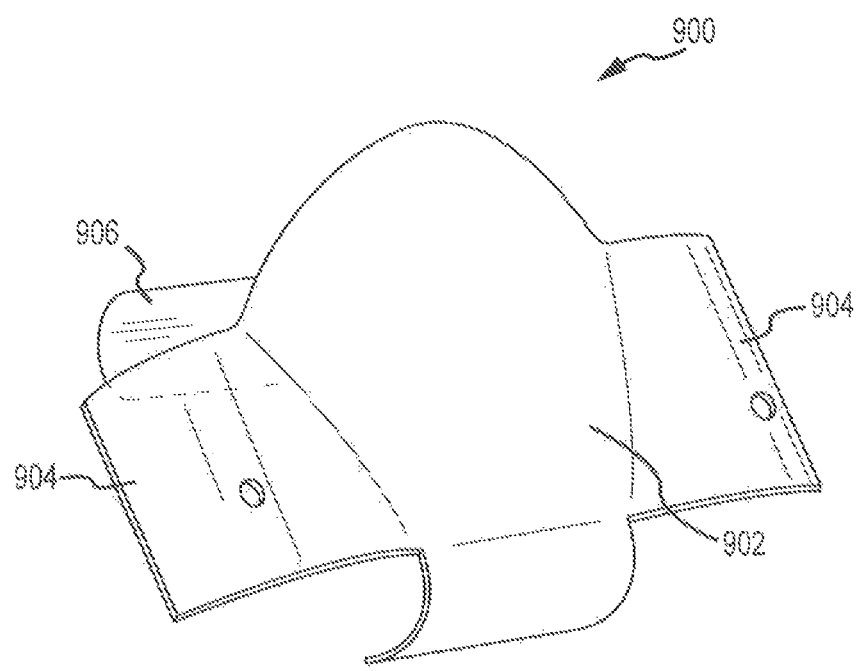
FIG. 9 illustrates a landing gear noise abatement system having a covering member with an void covering portion and side flange covering portions, in accordance with various embodiments.
Figure 14:
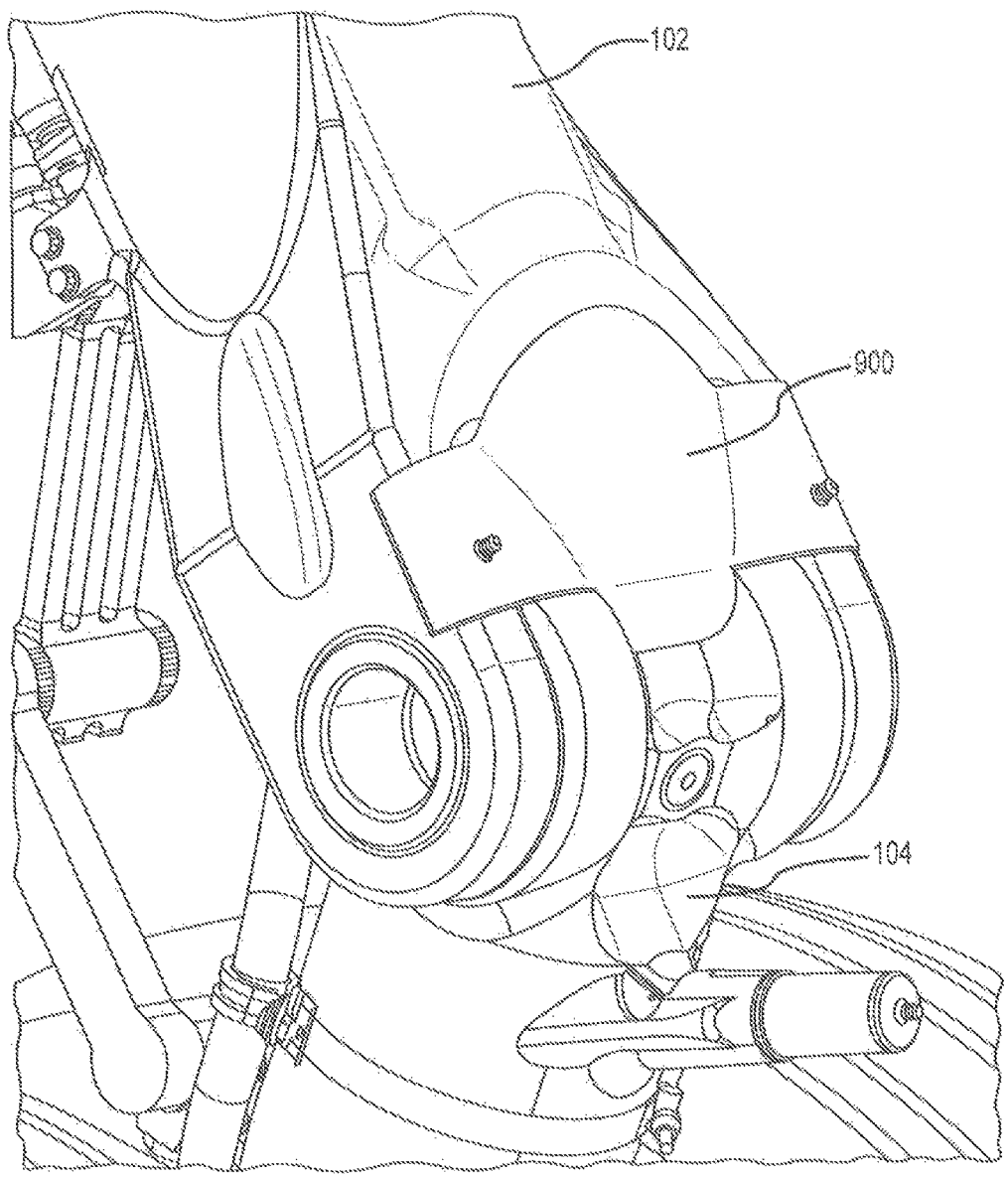
FIG. 14 illustrates a landing gear noise abatement system according to FIG. 9 installed in a landing gear, in accordance with various embodiments.

In various embodiments, with reference to FIGS. 9 and 14, noise abatement system 900 may have a retention member comprising a post 906 and a covering member with a void covering portion 902 and side flange covering portions 904. Side flange covering portions 904 may extend laterally to shield a portion of the landing gear, for example, the forward main post 102, or the joint between the forward main post 102 and the trailing arm 104. In various embodiments, side flange covering portions 904 may have cutouts to permit noise abatement system 900 to be installed without impinging on or otherwise interfering with other landing gear structures, for example, fittings such as grease zerks. Alternatively, the retention member may comprise a tab, or any other configuration suitable for holding, maintaining, or otherwise coupling or retaining noise abatement system 900 in mechanical communication with the landing gear.

Figure 10:
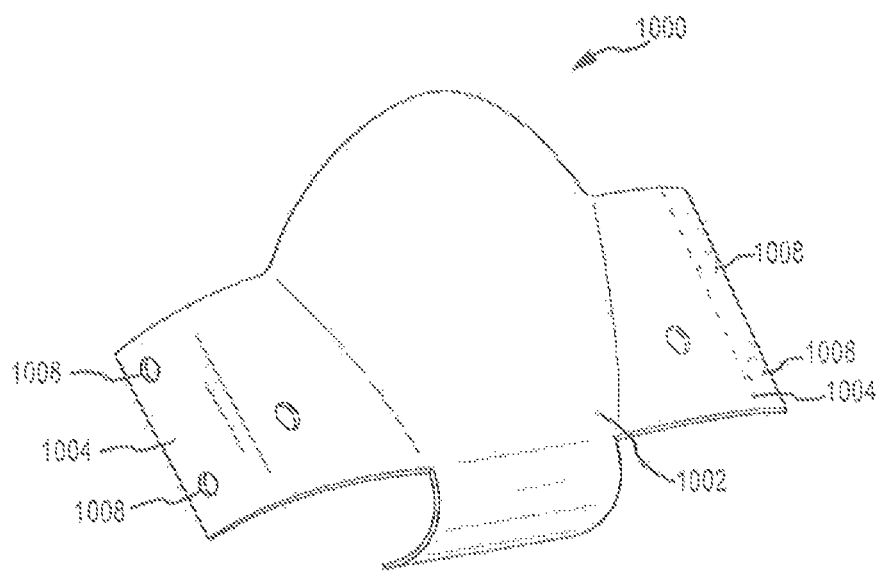
FIG. 10 illustrates a landing gear noise abatement system having a covering member with an void covering portion and fastening side flange covering portions, in accordance with various embodiments.
Figure 15:
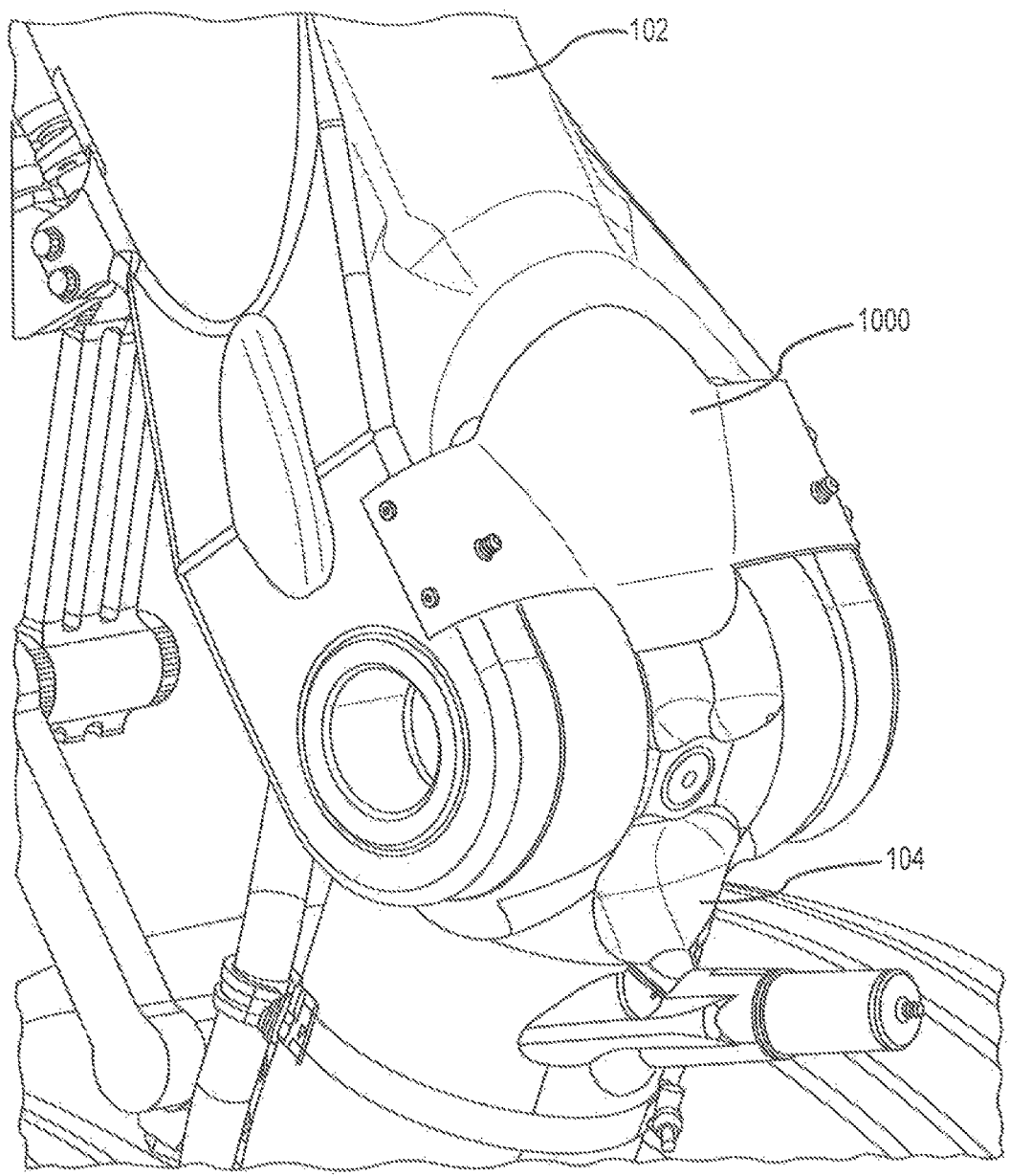
FIG. 15 illustrates a landing gear noise abatement system according to FIG. 10 installed in a landing gear, in accordance with various embodiments.

In various embodiments, with reference to FIGS. 10 and 15, noise abatement system 1000 may have a covering member with a void covering portion 1002 and fastening side flange covering portions 1004. Moreover, fastening side flange covering portions 1004 may also serve as a retention member. Fastening side flange covering portions 1004 may extend laterally to shield a portion of the landing gear, for example, the forward main post 102, or the joint between the forward main post 102 and the trailing arm 104. In various embodiments, fastening side flange covering portions 1004 may have cutouts to permit noise abatement system 1000 to be installed without impinging on or otherwise interfering with other landing gear structures, for example fittings such as grease zerks.

Furthermore, fastening slide flange portions 1004 may also serve as a retention member and may have a fastening apparatus 1008 by which noise abatement system 1000 may be held, maintained, or otherwise coupled or retained in mechanical communication with forward main post 102. In various embodiments, fastening side flange covering portions 1004 are bent, for example, to follow a profile of the forward main post 102, wherein a 90 degree bend causes fastening apparatus 1008 of at least one fastening side flange covering portion 1004 to be positioned generally against a face of forward main post 102 substantially normal to a plane of void covering portion 1002.

A noise abatement system 300 may comprise two fastening side flange covering portions 1004. Alternatively, a noise abatement system 300 may comprise one fastening side flange covering portion 1004, or three fastening side flange covering portions 1004, or four fastening side flange covering portions 1004 or any number or configuration of fastening side flange covering portions 1004 adapted to hold, maintain, or otherwise couple or retain system 300 in mechanical communication with forward main post 102.

Figure 11:
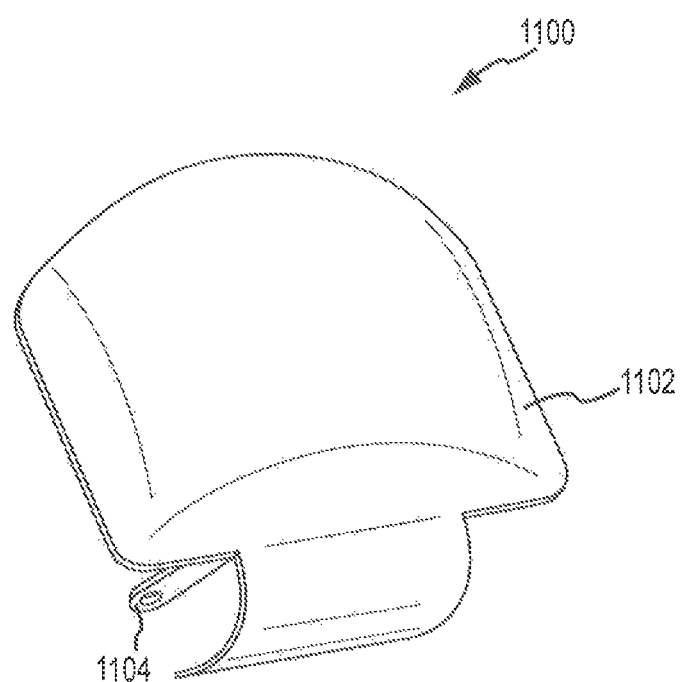
FIG. 11 illustrates a landing gear noise abatement system having a covering member shaped to ameliorate aerodynamic drag, in accordance with various embodiments.
Figure 16:
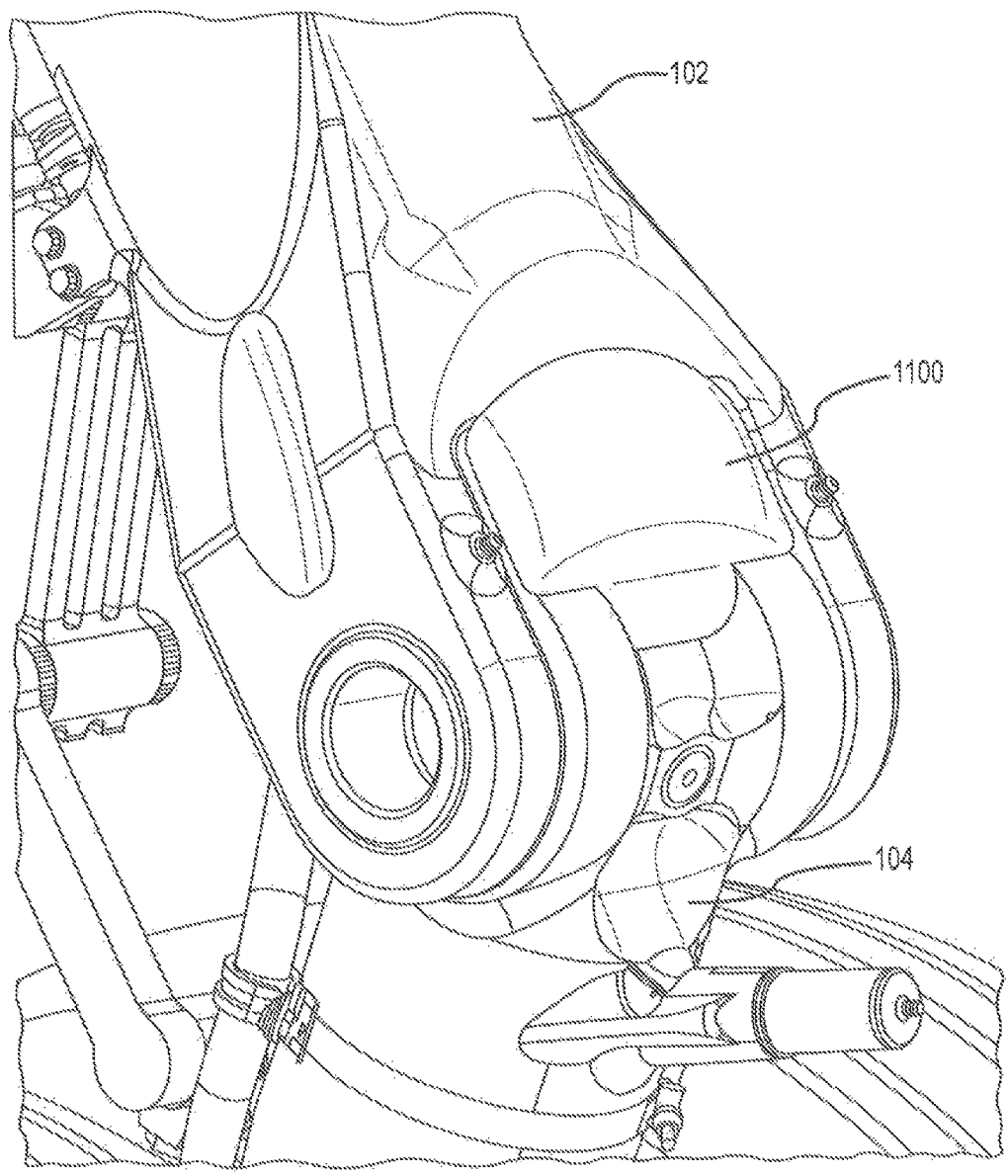
FIG. 16 illustrates a landing gear noise abatement system according to FIG. 11 installed in a landing gear, in accordance with various embodiments.

With reference to FIGS. 11 and 16, noise abatement system 1100 may have a covering member with a retention member comprising a tab 1104 and a void covering portion 1102 shaped to ameliorate aerodynamic drag, for example, by being curved. For example, the entire void covering portion 1102 is curved and the void covering portion 1102 comprises the entire covering member. Alternatively, the void covering portion 1102 comprises only a portion of the covering member, or still alternatively, in various embodiments, only a portion of the void covering portion 1102 is curved. A curve of the void covering portion 1102 may be a spherical cap, or may be a hemisphere. In various embodiments, the void covering portion 1102 may be conical in shape. In various embodiments, the void covering portion 1102 may comprise any shape adapted to diminish aerodynamic resistance exerted on system 1102. In various embodiments, the void covering portion 1102 may have a chord and a camber and may approximate an airfoil, for example, by conforming the profile of a portion of the landing gear to the profile of a NACA listed airfoil, or any other shape, configuration, or arrangement to ameliorate aerodynamic drag. Moreover, the retention member may alternatively comprise a post, or any other configuration suitable for holding, maintaining, or otherwise coupling or retaining noise abatement system 1100 in mechanical communication with the landing gear.

Now, having described various components of various exemplary noise abatement systems, a noise abatement system may be manufactured from various materials. In one exemplary embodiment, a noise abatement system may comprise plastic. Alternatively, a noise abatement system may comprise metal, such as titanium, aluminum or stainless steel, though it may alternatively comprise numerous other materials configured to provide support, such as, for example, composite, ceramic, a para-aramid fiber material such as a para-aramid fiber composite material, for example, a KEVLAR® brand material available from E. I. du Pont de Nemours and Company, ultra high molecular weight polyethylene such as an ultra-high molecular weight polyethylene composite material, for example, a DYNEEMA® brand material available from Royal DSM, an aramid fiber material such as an aramid fiber composite material, alloy, glass, binder, epoxy, polyester, acrylic, or any material or combination of materials having a desired strength, stiffness, or flexibility sufficient to maintain resiliency during use. In various embodiments, various portions of noise abatement systems as disclosed herein are made of different materials or combinations of materials, and/or may comprise coatings. For example, a retention member may be coated with a frictional material and covering member may be coated with an aerodynamic material. In various embodiments, the retention member is manufactured separately from the covering member.

In various embodiments, noise abatement systems may comprise multiple materials, or any material configuration suitable to enhance or reinforce the resiliency and/or support of the system when subjected to wear in an aircraft operating environment or to satisfy other desired electromagnetic, chemical, physical, or biological properties. Furthermore, noise abatement systems may comprise materials with grain structures or with no grain structures. Noise abatement systems may comprise materials with similar grain structures, or with differing grain structures or grain direction or with similar grain structures or grain direction or any grain structure or direction suitable for achieving desired properties in the system; for example, resiliency under aerodynamic loads and temperature changes.

In various embodiments, while the noise abatement systems described herein have been described in the context of aircraft applications; however, one will appreciate in light of the present disclosure, that the system described herein may be used in connection with various other vehicles, for example, cars, trucks, busses, trains, boats, and submersible vehicles, or any other vehicle or device, having a void through which gas or fluid may flow, creating, for instance, noise or drag.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft landing gear comprising:
 a forward main post comprising a forked clevis;
 a trailing arm connected to the forward main post by an articulating joint at the forked clevis, the forked clevis having a void; and
 a noise abatement system limiting airflow through the void,
  wherein the noise abatement system comprises:
   a retention member coupled to the aircraft landing gear, the retention member comprising a retention post configured to extend within the void and engage a cavity; and
   a covering member in mechanical communication with the retention member and configured to substantially cover the void.

2. The landing gear of claim 1, wherein the retention post is retained in mechanical communication with at least one of the forward main post and the trailing arm.

3. The landing gear of claim 2, wherein the covering member comprises a fastening apparatus whereby a fastener maintains the retention post in mechanical communication with at least one of the forward main post and the trailing arm.

4. The landing gear of claim 2, wherein the covering member comprises a void covering portion shaped to conform to the profile of at least one open space in the forked clevis.

5. The landing gear of claim 4, wherein the void covering portion of the covering member is curved.

6. The landing gear of claim 1, wherein the retention post is configured to interface with the forward main post.

7. The landing gear of claim 6, wherein the covering member is directly coupled to the retention post.

8. The landing gear of claim 7, wherein the retention post and the covering member comprise an integral unit.

9. The landing gear of claim 6, wherein the covering member is configured to substantially block air from flowing through the void.

10. The landing gear of claim 6, wherein the forward main post includes the cavity and wherein the retention post is configured to interface with the cavity via a friction fit between the retention post and the cavity.

11. The landing gear of claim 6, wherein the cavity comprises the void and wherein the retention post is configured to frictionally engage a bounding surface of the void.

* * * * *